(12) United States Patent
Sekiguchi

(10) Patent No.: US 6,697,409 B1
(45) Date of Patent: Feb. 24, 2004

(54) BEAM DISTRIBUTOR OF LASER APPARATUS CAPABLE OF EFFICIENTLY INTRODUCING PUMPING BEAM INTO LASER MEDIUM

(75) Inventor: Hiroshi Sekiguchi, Akishima (JP)

(73) Assignee: Hoya Corporation, Tokyo (JP)

(*) Notice: Subject to any disclaimer, the term of this patent is extended or adjusted under 35 U.S.C. 154(b) by 223 days.

(21) Appl. No.: 09/621,731

(22) Filed: Jul. 21, 2000

(30) Foreign Application Priority Data

Jul. 22, 1999 (JP) .......................................... 11-208175

(51) Int. Cl.[7] .................................................. H01S 3/09
(52) U.S. Cl. ............................. 372/69; 372/70; 372/32; 372/6
(58) Field of Search ............................. 372/69, 70, 6, 372/32

(56) References Cited

U.S. PATENT DOCUMENTS

| | | | | |
|---|---|---|---|---|
| 3,569,871 A | * | 3/1971 | Tomiyasu | 333/34 |
| 3,978,444 A | * | 8/1976 | Hitchcock | |
| 4,941,726 A | * | 7/1990 | Russell et al. | 350/96.15 |
| 5,923,694 A | * | 7/1999 | Culver | 372/69 |
| 6,324,326 B1 | * | 11/2001 | Dejneka et al. | 385/123 |

FOREIGN PATENT DOCUMENTS

JP            11-284255        10/1999

* cited by examiner

*Primary Examiner*—Paul Ip
*Assistant Examiner*—Leith Al-Nazer
(74) *Attorney, Agent, or Firm*—Sughrue Mion, PLLC

(57) ABSTRACT

A laser apparatus comprises a beam distributor to distribute a pumping beam over a laser medium. The beam distributor comprises a beam conductor having an incident surface and an intermediate surface smaller than the incident surface. The beam conductor conducts the pumping beam received by the incident surface to the intermediate surface. A main body is connected to the intermediate surface and has a plurality of surfaces and confines the pumping beam introduced through the intermediate surface by repeating total internal reflection at the surfaces. When the intermediate surface becomes small, quantity of the pumping beam escaping from the intermediate surface becomes small. The main body distributes the pumping beam confined therein over the laser medium where the laser medium is in contact with the surfaces of the main body.

19 Claims, 8 Drawing Sheets

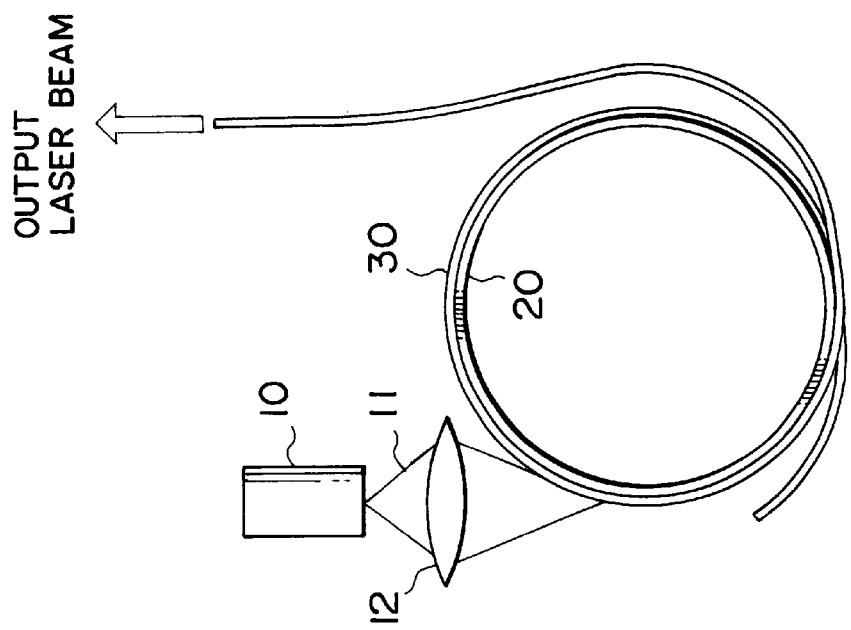
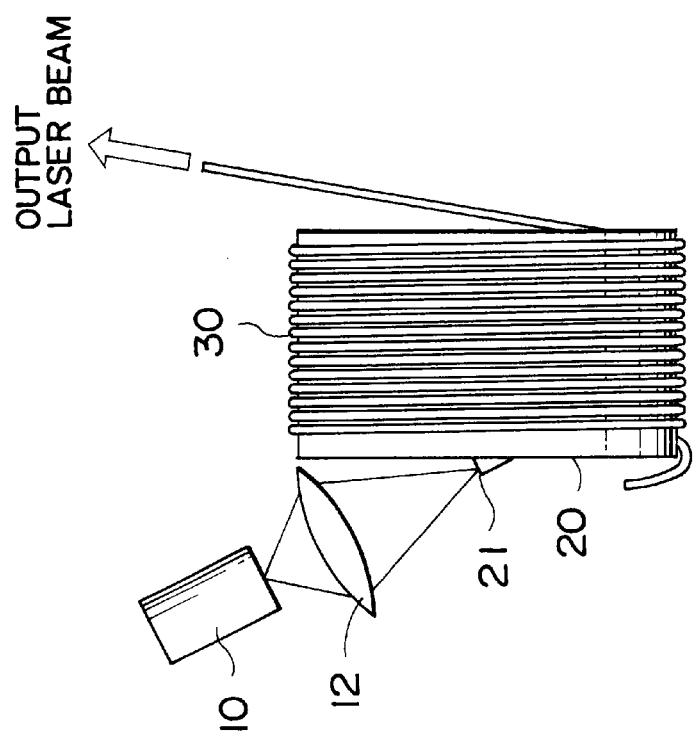

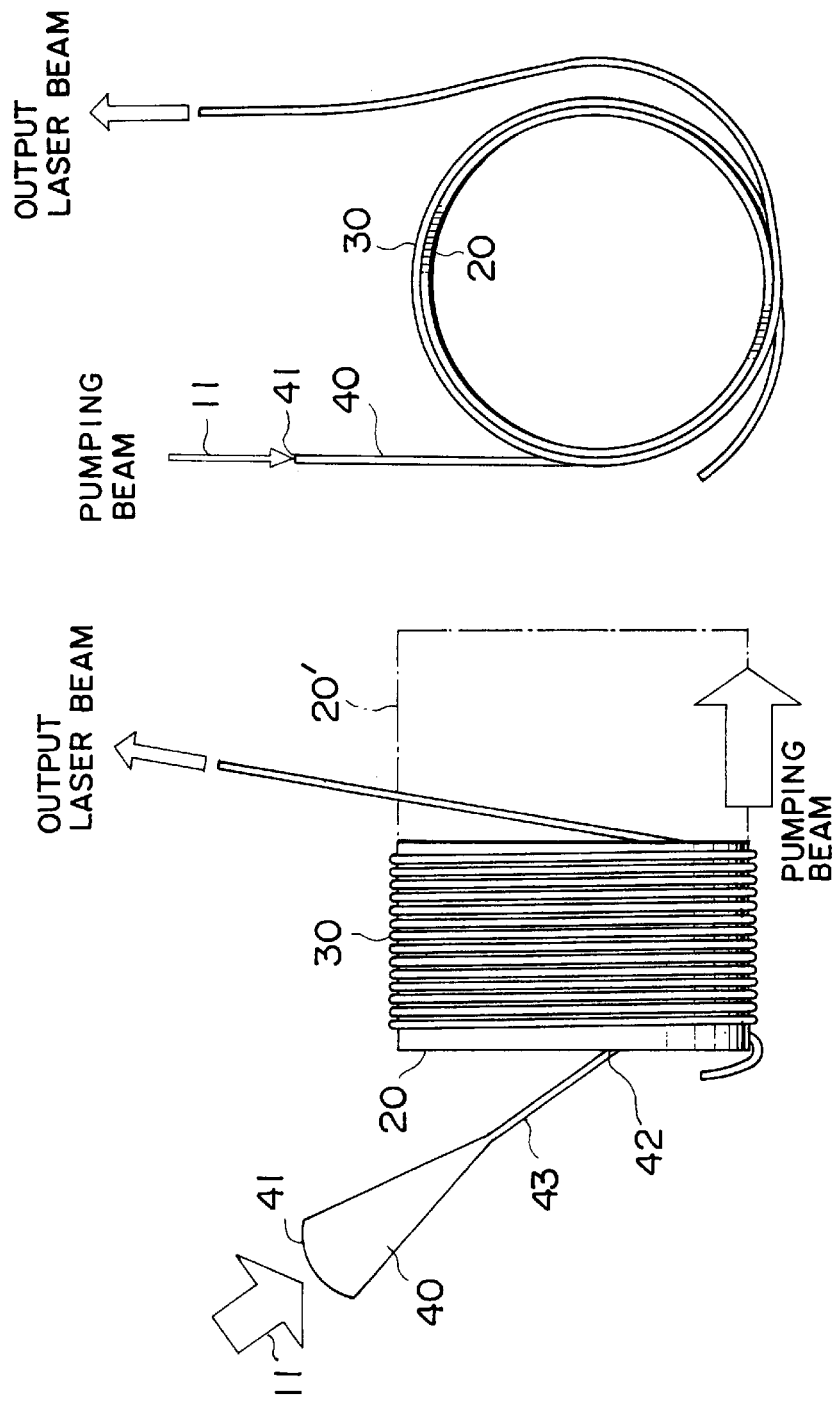

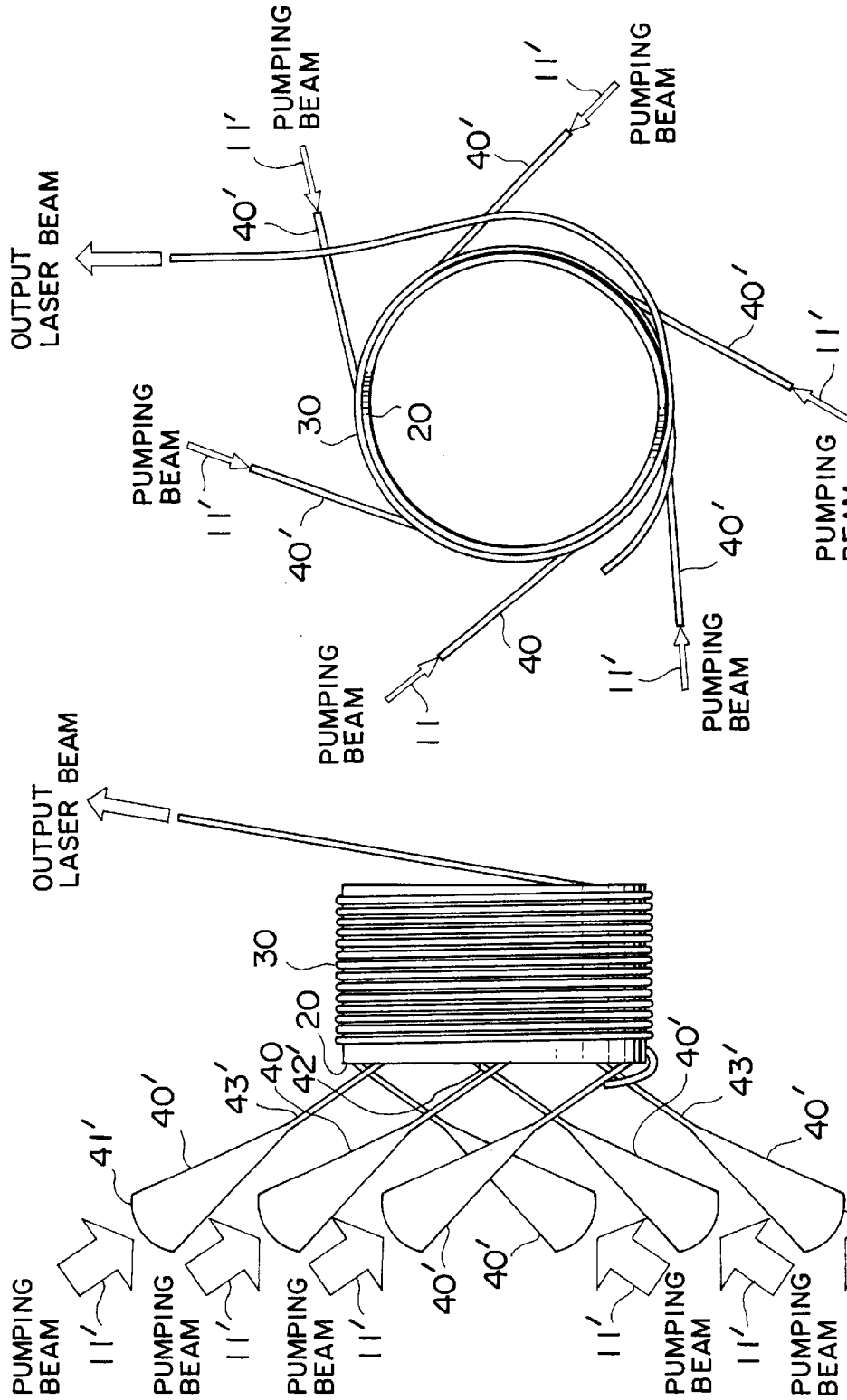

BEAM DISTRIBUTOR OF LASER APPARATUS CAPABLE OF EFFICIENTLY INTRODUCING PUMPING BEAM INTO LASER MEDIUM

BACKGROUND OF THE INVENTION

This invention relates to a laser apparatus and, particularly, to a beam distributor for distributing pumping beam over a laser medium to pump laser active materials doped in the laser medium.

In the fields of optical communication and laser beam machining, it is desired to develop a laser apparatus which is greater in output power and is less expensive. An optical fiber laser apparatus is known for its greater potential to meet the above-mentioned demand.

The optical fiber laser apparatus includes an optical fiber called a laser fiber that comprises a core doped with laser active materials and a clad surrounding (or cladding) the core. The laser active materials are, for example, laser active ions, pigments, or other luminescent materials.

In the optical fiber laser apparatus, a single transverse mode of laser oscillation can relatively easily be achieved by appropriately selecting a diameter of the core and a difference in refractive index between the core and the clad. In addition, by confining a pumping beam within the core at a high density, it is possible to enhance an interaction between the laser active materials and the pumping beam. Furthermore, by increasing the length of the laser fiber, the interaction can be extended so as to produce a high-quality laser beam with a high efficiency. Thus, it is possible by the use of the optical fiber laser apparatus to obtain at a relatively low cost a laser beam excellent in quality.

In order to realize further increase in output power and efficiency of the optical fiber laser apparatus, it is necessary to efficiently introduce the pumping beam into the core. Generally, when the core diameter is determined so as to satisfy a single-mode waveguide condition, it is restricted to a value not greater than ten and several micrometers. Therefore, it is generally difficult to efficiently introduce the pumping beam within the core. To overcome the difficulty, proposal is made of a so-called double-clad fiber laser.

The double-clad fiber laser comprises an optical fiber having a core doped with laser active materials, a first clad surrounding the core and having a first refractive index lower than that of the core, and a second clad cladding the first clad and having a second refractive index lower than the first refractive index. With this structure, a pumping beam introduced into the first clad from the end of the optical fiber is kept confined inside a boundary between the first clad and the second clad during propagation. This is because total internal reflection occurs at the boundary due to the difference in refractive index between the first and the second clads. During the propagation, the pumping beam repeatedly passes through the core and pumps the laser active materials contained in the core. The first clad has a sectional area corresponding to several hundreds to one thousand times that of the core. Therefore, a greater quantity of the pumping beam can be introduced into the optical fiber so as to increase the output power.

Thus, the double-clad fiber laser is advantageous in that the oscillation efficiency is high and that the transverse mode of oscillation is a single mode and stable. Consequently, by using a laser diode as a pumping beam source, the output power of several or about ten watts are obtained in the double-clad fiber laser and are much larger than that of a previous single-clad fiber laser.

However, the double-clad fiber laser is disadvantageous in that the pumping beam source is limited in number because the pumping beam must be introduced into the optical laser at the end of the laser fiber. Thus, there is no way to increase the output power of the double-clad fiber laser except for a way of increasing luminance (or output power) of the pumping beam source (i.e. the laser diode).

In order to overcome the above-mentioned disadvantage, Applicant proposed an optical fiber laser apparatus having a structural member for distributing a pumping beam over a laser fiber, which is directly or indirectly in contact with the structural member. The optical fiber laser apparatus is disclosed in Japanese Unexamined Patent Publication (JP-A) No. H11-284255. Hereinafter, the structural member will be referred to as a beam distributor.

The beam distributor has a main body having a hollow or solid cylindrical shape and a prism formed at an end surface of the main body. If the pumping beam is introduced at a predetermined angle in the beam distributor through an incident surface of the prism, it is confined within the main body by the total internal reflection at its surfaces. When a laser fiber is coiled around the beam distributor, the pumping beam confined in the beam distributor is introduced into the laser fiber. This is because the necessary conditions of the total internal reflection do not be met at a contact area where the beam distributor and the laser fiber are in contact with each other. The pumping beam introduced in the laser fiber pumps laser active materials included in a core of the laser fiber. Thus, in the optical fiber laser apparatus, pumping is equally made at a long range of the laser fiber and the laser fiber efficiently generates a laser beam.

By the way, the beam distributor decreases the pumping beam during propagation within the beam distributor. That is, the pumping beam is partially lost by propagation loss in the beam distributor and escape loss from the incident surface. If the total of the propagation loss and the escape loss in the beam distributor is large, the pumping beam is inefficiently introduced into the laser fiber. Therefore, it is desirable to make small both of the propagation loss and the escape loss.

The propagation loss can be suppressed by the use of a quartz glass that has high transparency while the escape loss can be suppressed by making small the incident surface.

However, when the incident surface is small, it is necessary to condense the pumping beam at the incident surface. As a result, power density of the pumping beam inevitably increase at the incident surface. If the incident surface is stained with dust, the dust is scorched by the condensed pumping beam and stuck on the incident surface. The stuck dust on the incident surface not only prevents the pumping beam from being introduced into the beam distributor also is heated by the pumping beam very much. The heat of the stuck dust partially damages the incident surface.

SUMMARY OF THE INVENTION

It is therefore an object of this invention to provide a beam distributor which is capable of being introduced with large quantity of pumping beam.

It is another object of this invention to provide a beam distributor which is capable of efficiently introducing a pumping beam into a laser medium.

It is still another object of this invention to provide a beam distributor which is difficult to be influenced by dust on an incident surface.

It is yet another object of this invention to provide a laser apparatus which comprises a beam distributor capable of being introduced with large quantity of pumping beam.

It is a further object of this invention to provide a laser apparatus which comprises a beam distributor capable of efficiently introducing a pumping beam into a laser medium.

It is a still further object of this invention to provide a laser apparatus which comprises a beam distributor difficult to be influenced by dust on an incident surface.

Other object of this invention will become clear as the description proceeds.

According to the gist of this invention, a beam distributor is used in a laser apparatus to distribute a pumping beam supplied from a pumping beam source over a laser medium. The beam distributor comprises a beam conductor which has an incident surface and an intermediate surface and which conducts the pumping beam received by the incident surface to the intermediate surface. A main body is connected to the intermediate surface and has a plurality of surfaces. The main body confines the pumping beam introduced therein through the intermediate surface, by repeating total internal reflection at the surfaces, to distribute the pumping beam confined therein over the laser medium where the laser medium is in contact with the surfaces of the main body.

According to another gist of this invention, a laser apparatus comprises a pumping beam source which produces a pumping beam. A laser medium is pumped by the pumping beam to emit a laser beam. A beam distributor distributes the pumping beam over the laser medium to pump the laser medium. The beam distributor comprises a beam conductor which have an incident surface and an intermediate surface and which conducts the pumping beam received by the incident surface to the intermediate surface. A main body is connected to the intermediate surface and has a plurality of surfaces. The main body confines the pumping beam introduced therein through the intermediate surface, by repeating total internal reflection at the surfaces, to distribute the pumping beam confined therein over the laser medium where the laser medium is in contact with said surfaces of the main body.

According to still another gist of this invention, a laser unit has a laser medium to emit a laser beam in response to a pumping beam supplied from a pumping beam source. The laser unit comprises a beam conductor which has an incident surface and an intermediate surface and which conducts the pumping beam received by the incident surface to the intermediate surface. A main body is connected to the intermediate surface and has a plurality of surfaces. The main body confines the pumping beam introduced therein through the intermediate surface, by repeating total internal reflection at the surfaces, to distribute the pumping beam confined therein over the laser medium where the laser medium is in contact with the surfaces of the main body.

BRIEF DESCRIPTION OF THE DRAWING

FIGS. 1A and 1B show a side view and a rear view of a conventional laser apparatus, respectively;

FIGS. 6A and 6B show a side view and a rear view of a laser apparatus according to a second embodiment of this invention, respectively;

FIGS. 7A and 7B show a side view and a rear view of a laser apparatus according to a third embodiment of this invention, respectively;

DESCRIPTION OF THE PREFERRED EMBODIMENTS

Figure 2B:
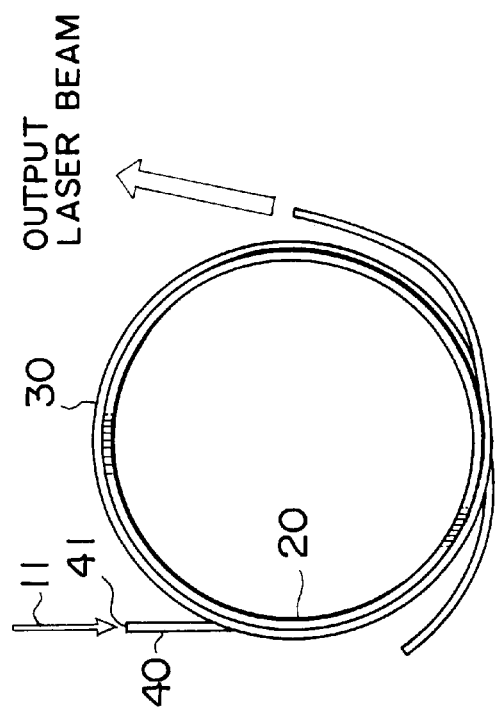
FIGS. 2A and 2B show a side view and a rear view of a laser apparatus according to a first embodiment of this invention, respectively.

Referring to FIG. 1, description will be at first directed to a conventional laser apparatus for a better understanding of this invention.

FIGS. 1A and 1B are side view and rear view of the conventional laser apparatus, respectively.

In FIGS. 1A and 1B, the conventional laser apparatus comprises a pumping beam source 10, a condenser 12, a beam distributor having a main body 20 and a prism 21, and a laser medium 30. A combination of the beam distributor and the laser medium 30 is called a laser unit.

The pumping beam source 10 is, for example, a semiconductor laser device or a laser diode and produces a pumping beam 11.

The condenser 12 is an optical lens and condenses the pumping beam 11 at an area on an incident surface of the prism 21.

The main body 20 has a hollow cylindrical shape and end surfaces. The prism 21 is fixed on one of the end surfaces of the main body 20 and serves an incident window for introducing the pumping beam from the condenser 12 into the main body 20.

The main body 20 confines the pumping beam introduced through the prism 21 by repeating total internal reflection at its surfaces.

The laser medium 30 is an optical fiber called a laser fiber which has a core doped with laser active materials and a clad cladding the core. The laser medium 30 is coiled around the main body 20. In a contact area where the laser medium 30 is in contact with the main body 20, the pumping beam is introduced into the laser medium 30. In the laser medium 30, a part of rays of the pumping beam is absorbed by the laser active materials and the remains return to the main body 20.

With this structure, the pumping beam introduced in the main body 20 spreads over the whole of the main body 20 and is introduced into the laser medium 30 through the contact area. Accordingly, the laser medium 30 is introduced with the pumping beam throughout the length of the laser medium 30 coiled around the main body 20.

Therefore, the main body 20 equally distributes the pumping beam over the predetermined length of the laser medium from the side. Consequently, the laser apparatus efficiently emits an output laser beam.

However, the incident surface of the prism 21 must be small to prevent the pumping beam escaping from there. This means that the condenser 12 must condense the pumping beam at a very small area on the incident surface. Therefore, the beam distributor has a disadvantage that power density of the pumping beam inevitably increases on the incident surface. The disadvantage causes that dust is scorched by the condensed pumping beam and stuck on the incident surface and prevent the pumping beam from being introduced into the main body 20. Furthermore, the dust is heated by the pumping beam very much and damages the incident surface.

Referring to FIGS. 2 through 5, the description will proceed to a laser apparatus according to a first embodiment of this invention. Similar parts are designated by the same reference numerals.

Figure 2A:
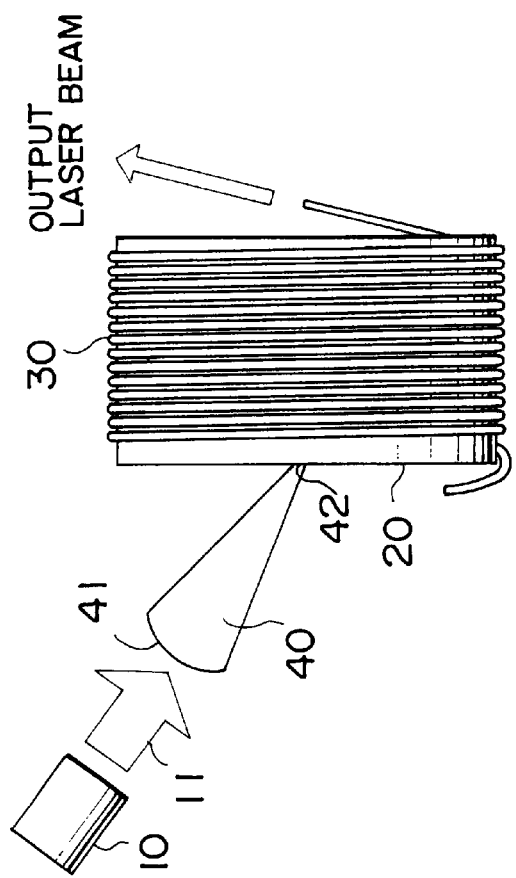

FIGS. 2A and 2B are a side view and a rear view of the laser apparatus, respectively.

In the FIGS. 2A and 2B, the laser apparatus comprises a beam conductor 40 that is connected to the end surface of the main body 20 so as to make one body together with the main body 20. For example, the beam conductor 40 is made of quartz glass and connected to the main body 20 by depositing, an adhesive, or the use of an optical contact. The beam conductor 40 and the main body 20 may be made by integral molding or shaving.

The beam conductor 40 has both of a taper shape as shown in FIG. 2A and a board shape as shown in FIG. 2B. The beam conductor 40 has a curved incident surface 41 for receiving and condensing the pumping beam 11, an intermediate surface 42 connected to (or integrated with) the end surface of the main body 20, and side surfaces extending from the incident surface 41 to the intermediate surface 42. The incident surface 41 is much larger than both of the intermediate surface 42 and the incident surface of the prism 21 of FIG. 1. The intermediate surface 42 is smaller than the incident surface of the prism 21. Mirror grinding is performed to the side surfaces. The beam conductor 40 serves both as an optical guide and a condenser.

The laser medium 30 is the laser fiber which is made of quartz glass and which is directly coiled and fixed around the main body 20 at regular intervals. The laser fiber has a length of 150 m and a pair of ends. Moreover, the laser fiber has the core with a diameter of 50 $\mu$m and the clad with an diameter of 125 $\mu$m. The core is doped with $Nd^{3+}$ ions with a density of 0.4 at % as the laser active materials. Plane grinding is performed to one of the ends and coating films are made on the ground end so that reflectance for an emitted laser beam of a wavelength of 1.06 $\mu$m is over 98% at the ground end. The other end is a perpendicular cross section which has a reflectance of about 4% for the emitted laser beam. The output laser beam goes out from the other end.

The main body 20 is made of, for example, quartz glass and has an outer diameter of 10 cm, a length of 7 cm and a thickness of 1 mm. The end surfaces of the main body 20 are perpendicular to the central axis of the main body 20. Mirror grinding is performed to the end surfaces, an inner surface, and an outer (or peripheral) surface.

An operation of the laser apparatus will be explained in below.

The pumping beam source 10 produces the pumping beam 11 and applies the pumping beam 11 to the incident surface 41. The incident surface 41 receives the pumping beam 11 and introduces the pumping beam into the beam conductor 40. The pumping beam 11 introduced in the beam conductor 40 is confined in the beam conductor 40 by total internal reflection at the side surfaces and propagates from the incident surface 41 to the intermediate surface 42. The pumping beam reached at the intermediate surface 42 is introduced into the main body 20.

The main body 20 confines the pumping beam therein by repeating total internal reflection at the inner surface, the outer surface, and the end surfaces. Then the pumping beam is spread over all surfaces. The pumping beam is introduced into the laser medium 30 at the contact area and the laser active materials are pumped by the pumping beam introduce in the laser medium 30. Therefore, the laser medium 30 is equally introduced with the pumping beam throughout the length of the laser medium 30 coiled around the main body 20. That is, the main body 20 equally distributes the pumping beam over the whole of laser medium 30 from the side. Consequently, the pumping beam introduced in the laser medium 30 efficiently pumps the laser active materials and the laser apparatus efficiently emits the output laser beam.

According to this embodiment, because the intermediate surface 42 is smaller than the incident surface of the prism 21 of FIG. 1, the escape loss is less than that of the conventional laser apparatus. The main body 20 more efficiently confines the pumping beam introduced therein by the total internal reflection and efficiently introduces the pumping beam into the laser medium 30.

Moreover, according to this embodiment, the power density of the pumping beam 11 on the incident surface 41 can be reduced because the incident surface 41 is much larger than the incident surface of the prism 21. Accordingly, the dust on the incident surface 41 hardly influences the introducing the pumping beam into the main body 20. Therefore, more large quantity of the pumping beam can be introduced into the main body 20 and the laser medium 30.

A shape and sizes of the incident surface 41 can be decided regardless of that of the intermediate surface 42. In other words, the shape and the sizes of the incident surface 41 can be decided so as to be introduced the pumping beam at the highest efficiency. It is to raise the introducing efficiency of the pumping beam into the beam conductor 40 that the incident surface 41 is the curved surface. Namely, the curved surface serves as the condenser 12.

Because the main body 20 has the hollow cylindrical shape, propagation paths of the pumping beam are short and the propagation loss in the main body 20 is small. In addition, the main body 20 having a hollow cylindrical shape is easy to radiate heat. If the thickness of the main body 20 becomes thin, the propagation loss reduces and the efficiency of radiating heat raises. Thus, it is desired that the thickness of the main body 20 is thinner. In the conventional laser apparatus, when the thickness becomes thin, it becomes difficult to introduce the pumping beam into the main body 20. However, according to this embodiment, the beam conductor 40 makes easy to introduce the pumping beam into the main body 20 regardless the thickness of the main body 20.

Generally, the semiconductor laser as the pumping beam source 10 produces the pumping beam that has a long and narrow shape in section. The sectional shape of the pumping beam has an aspect ratio of between about several tens to one and about several hundreds to one. Especially, a laser bar, which comprises a plurality of semiconductor lasers arranged in line to obtain high luminance or high output power, produces the pumping beam with an aspect ratio of about one thousand to one. Because the incident surface 41 has a long and narrow shape, it is advantageous to receive the pumping beam 11.

Actually, when the pumping beam source 10 produced the pumping beam having a wavelength of 807 nm with the output power of 30 W, the laser apparatus produced the output laser beam having 1060 nm with the output power of 10 W.

The laser apparatus can be used as a high efficiency optical amplifier or a beam source section of a high efficiency laser machining besides a beam source section of an optical transmitter.

Figure 3:
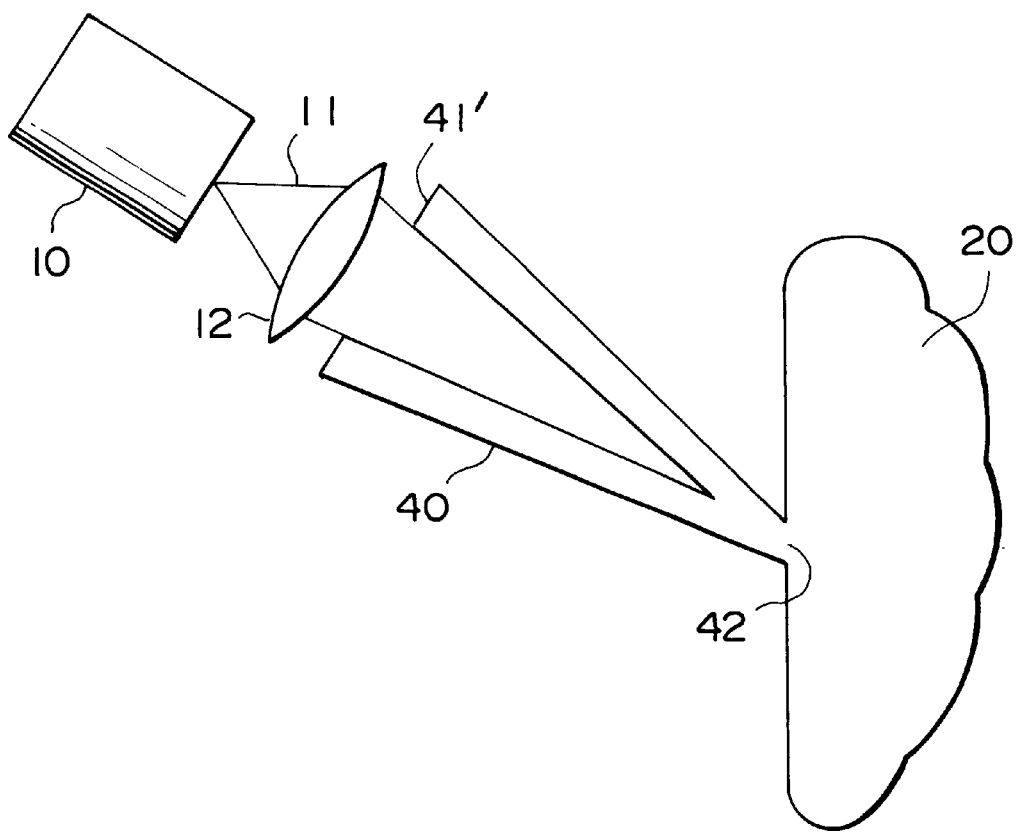
FIG. 3 shows a side view of a beam conductor used in the laser apparatus of FIG. 1.

Referring to FIG. 3, a modification of the beam conductor 40 will be mentioned soon.

As shown in FIG. 3, the beam conductor 40 has a flat incident surface 41'. In this case, it is desirable to locate the condenser 12 between the pumping beam source 10 and the incident surface 41'.

Figure 4A:
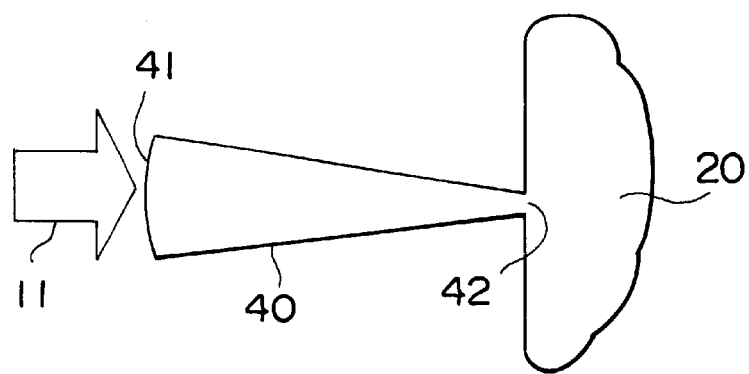
FIGS. 4A and 4B show side views of other beam conductors used in the laser apparatus of FIG. 1.
Figure 4B:
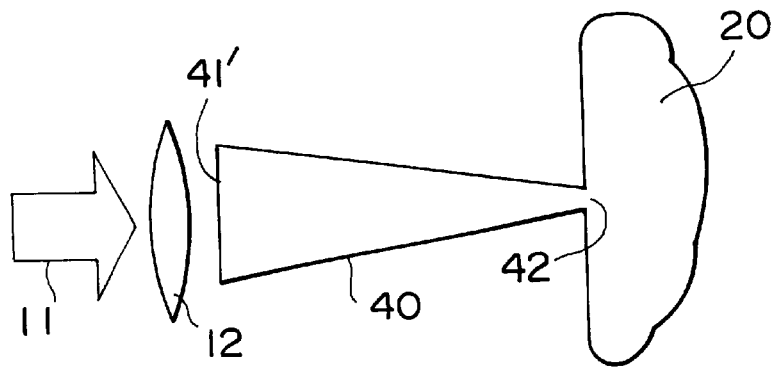

Referring to FIGS. 4A and 4B, another modification of the beam conductor 40 will be mentioned soon.

As illustrated in FIGS. 4A and 4B, the beam conductor 40 may be perpendicular to the end surface of the main body 20.

Figure 5:
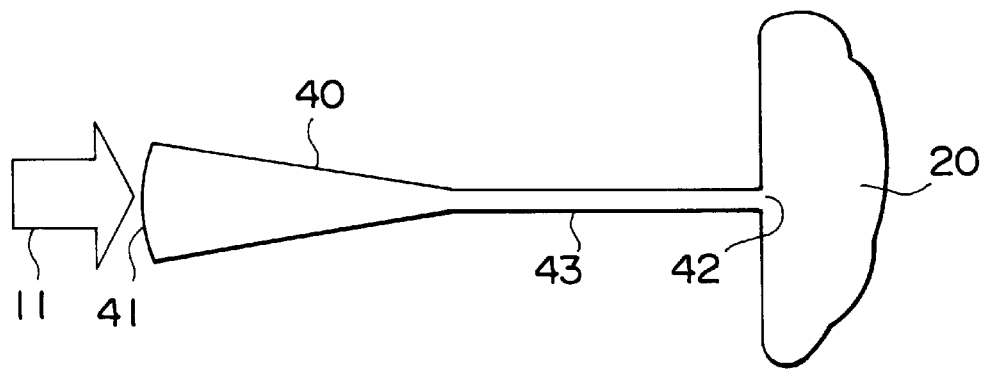
FIG. 5 shows a side view of still another beam conductors used in the laser apparatus of FIG. 1.

FIG. 5 shows still another modification of the beam conductor 40. The beam conductor 40 of FIG. 5 is connected to the main body 20 through an optical fiber (or a glass line) 43. In this case, the optical fiber 43 may incline to end surface of the main body 20.

Referring to FIGS. 6A and 6B, the description will be made about a laser apparatus according to a second embodiment of this invention.

The laser apparatus comprises an additional beam distributor 20' coupled to the main body 20. The additional beam distributor 20' does not have the beam conductor 40. The end surface of the additional beam distributor 20' adheres to the end surface of the main body 20. With this structure, the pumping beam introduced in the main body 20 spreads into the additional beam distributor 20' and is confined in the both of the main body 20 and the beam distributors 20'.

The laser medium 30 may be coiled around the additional beam distributor 20' or an additional laser medium (not shown) may be coiled around the additional beam distributor 20'.

Referring to FIGS. 7A and 7B, the description will be made about a laser apparatus according to a third embodiment of this invention.

The laser apparatus comprises at least one of additional beam conductors 40'. The additional beam conductors 40' are connected to the main body 20 with the optical fiber 43'. The additional beam conductors 40' are individually supplied with pumping beams 11' from additional pumping beam sources (not shown). The number of combinations of the beam conductors 40' and the pumping beam sources decides amount of the pumping beam introduced in the main body 20. Accordingly, the number of the combination can be decided on the basis of the desired output power.

Figure 8A:
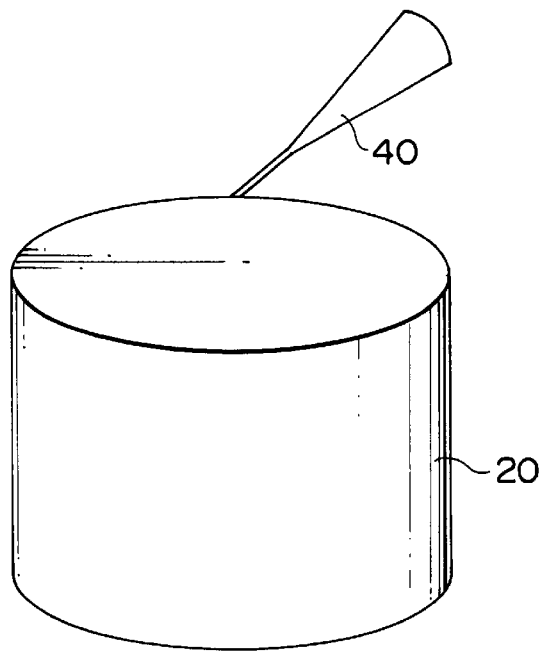
FIGS. 8A to 8C are perspective views of beam conductors having various shapes.
Figure 8B:
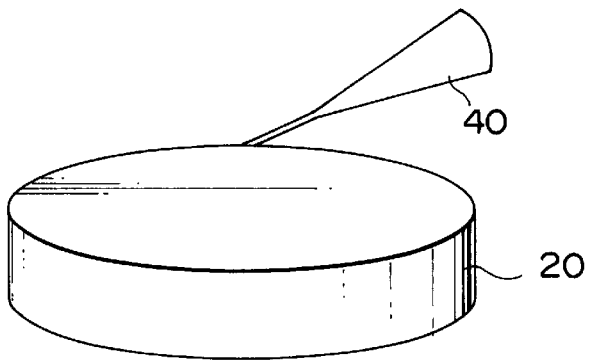
Figure 8C:
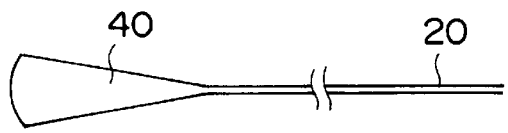

While this invention has thus for been described in conjunction with the preferred embodiments thereof, it will readily be possible for those skilled in the art to put this invention into practice in various other manners. For example, the main body 20 may have another shape, such as a solid cylinder shape, a thick disk shape, or a fiber shape as illustrated in FIGS. 8A through 8C. In the case of FIG. 8C, laser medium 30 is arranged along and in contact with the main body 20. The main body 20 of FIG. 8C may be coiled around a cylindrical core together with the laser medium 30.

Figure 9:
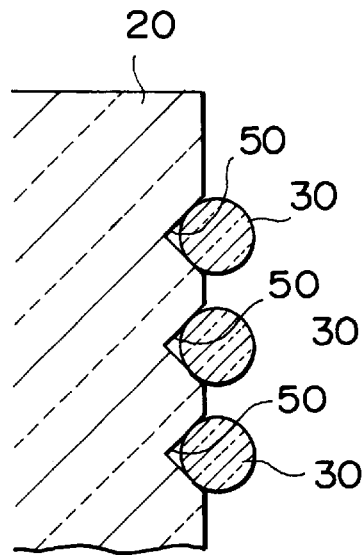
FIG. 9 is a partial sectional view of a beam distributor having a groove.

Moreover, the main body 20 may has a spiral groove 50 on the outer (or the peripheral) surface as shown in FIG. 9. In this case, the laser medium 30 is located in the groove.

Figure 10A:
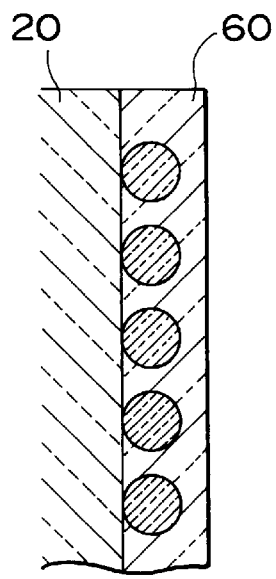
FIGS. 10A and 10B are partial sectional views of beam distributors, each of which is covered with a subsidiary member.
Figure 10B:
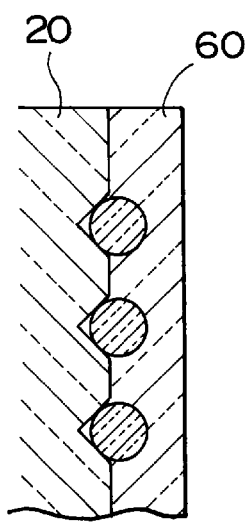

Furthermore, the laser apparatus may have a subsidiary member 60 (60'), such as a transparent adhesive, quartz glass, or acrylic acid resin, for covering the laser medium 30 coiled around the main body 20 as shown in FIGS. 10A and 10B. In this case, the subsidiary member 60 (60') must have a reflective index that is equal to or smaller than that of the main body 20 to confine the pumping beam. In addition, the subsidiary member 60 (60') may be between the laser medium 30 and the main body 20 besides the outside of the laser medium 30. The subsidiary member 60 has an external surface to which mirror grinding is performed. The pumping beam introduced in the main body 20 is confined in the both of the main body 20 and the subsidiary member 60 (60') by the total internal reflection at not the outer surface of the main body 20 but the external surface of the subsidiary member 60 (60').

Still furthermore, the beam conductor 40 may be made of another transparent material, such as acrylic acid resin. The beam conductor 40 is not always equal to the main body 20 in material.

Yet furthermore, the pumping beam source 10 may be a xenon discharge tube.

What is claimed is:

1. A beam distributor for use in a laser apparatus to distribute pumping beam supplied from a pumping beam source over a laser medium which is separated from said beam distributor and which has a pair of ends, said beam distributor comprising:

a beam conductor having an incident surface different from said ends of said laser medium and an intermediate surface smaller than said incident surface for conducting the pumping beam received by said incident surface to said intermediate surface to emit the pumping beam onto a position different from the laser medium; and a main body connected to said intermediate surface and having a cylindrical shape and a plurality of surfaces for confining the pumping beam introduced therein through said intermediate surface, by repeating total internal reflection at said surfaces, said plurality of surfaces including an outer peripheral surface; wherein:

said main body distributes the pumping beam confined therein over said laser medium, which is wound on said outer peripheral surface of said main body to form a laser medium coil, by entering the pumping beam in said laser medium from the inside of said laser medium coil through a contact area where said laser medium is in contact with said outer peripheral surface of the main body.

2. A beam distributor as claimed in claim 1, wherein said beam conductor has side surfaces to conduct the pumping beam from said incident surface to said intermediate surface by total internal reflection at said side surfaces.

3. A beam distributor as claimed in claim 1, wherein said incident surface is a curved surface.

4. A beam distributor as claimed in claim 1, wherein said main body is connected to said intermediate surface with an optical fiber.

5. A beam distributor as claimed in claim 1, wherein said beam distributor further comprises an additional beam conductor.

6. A beam distributor as claimed in claim 1, wherein said main body has a cylindrical shape.

7. A laser apparatus comprising:

a pumping beam source for producing a pumping beam, a laser medium which has a pair of ends and which is pumped by the pumping beam for emitting a laser beam, and a beam distributor separated from said laser medium for distributing the pumping beam over said laser medium to pump said laser medium, wherein said beam distributor comprises:

a beam conductor having an incident surface different from said ends of said laser medium and an intermediate surface smaller than said incident surface for conducting the pumping beam received by said incident surface to said intermediate surface to emit the pumping beam onto a position different from the laser medium; and a main body connected to said intermediate surface and having a cylindrical shape and a plurality of surfaces for confining the pumping beam introduced therein through said intermediate surface, by repeating total internal reflection at said surfaces, said plurality of surfaces including an outer peripheral surface; wherein said main body distributes the pumping beam confined therein over said laser medium, which is wound on said outer peripheral surface to form a laser medium coil, by entering the pump beam in said laser medium from the inside of said laser medium coil through a contact area where said laser medium is in contact with said outer peripheral surface of the main body.

8. A laser apparatus as claimed in claim 7, wherein said beam conductor has side surfaces to conduct the pumping beam from said incident surface to said intermediate surface by total internal reflection at said side surfaces.

9. A laser apparatus as claimed in claim 7, wherein said incident surface is a curved surface.

10. A laser apparatus as claimed in claim 7, wherein said main body is connected to said intermediate surface with an optical fiber.

11. A laser apparatus as claimed in claim 7, wherein said beam distributor further comprises an additional beam conductor.

12. A laser apparatus as claimed in claim 7, wherein said main body has a cylindrical shape.

13. A laser apparatus as claimed in claim 7, wherein said laser medium is an optical fiber in which optical active materials are doped.

14. A laser apparatus as claimed in claim 13, wherein said laser medium is coiled around said main body.

15. A laser apparatus as claimed in claim 7, wherein said laser medium is directly in contact with said main body.

16. A laser apparatus as claimed in claim 7, wherein said laser apparatus further comprises a subsidiary member for covering said laser medium, said subsidiary member having an external surface to bring the total internal reflection to said external surface.

17. A laser unit having a laser medium, which has a pair of ends, for emitting a laser beam in response to a pumping beam supplied from an external pumping beam source, said laser unit comprising a beam distributor separated from said laser medium, wherein said beam distributor comprises:

a beam conductor having an incident surface different from said ends of said laser medium and an intermediate surface smaller than said incident surface for conducting the pumping beam received by said incident surface to said intermediate surface to emit the pumping beam onto a position different from the laser medium; and a main body connected to said intermediate surface and having a cylindrical shape and a plurality of surfaces for confining the pumping beam introduced therein through said intermediate surface, by repeating total internal reflection at said surfaces, said plurality of surfaces including an outer peripheral surface; wherein said main body distributes the pumping beam confined therein over said laser medium, which is wound on said outer peripheral surface to form a laser medium coil, by entering the pumping beam in said laser medium from the inside of said laser medium coil through a contact area where said laser medium is in contact with said outer peripheral surface of the main body.

18. A beam distributor for use in a laser apparatus to distribute pumping beam supplied from a pumping beam source over a laser medium, which is separated from said beam distributor and which has a pair of ends, said beam distributor comprising:

a beam conductor having an incident surface different from said ends of said laser medium and an intermediate surface smaller than said incident surface for conducting the pumping beam received by said incident surface to said intermediate surface to emit the pumping beam onto a position different from the laser medium; and a main body connected to said intermediate surface and having a disk shape and a plurality of surfaces for confining the pumping beam introduced therein through said intermediate surface, by repeating total internal reflection at said surfaces; wherein:

said main body distributes the pumping beam confined therein over said laser medium by entering the pumping beam in said laser medium through a contact area where said laser medium is in contact with said surfaces of said main body.

19. A laser apparatus comprising a pumping beam source for producing a pumping beam, a laser medium which has a pair of ends and which is pumped by the pumping beam for emitting a laser beam, and a beam distributor separated from said laser medium for distributing the pumping beam over said laser medium to pump said laser medium, wherein said beam distributor comprises:

a beam conductor having an incident surface different from said ends of said laser medium and an intermediate surface smaller than said incident surface for conducting the pumping beam received by said incident surface to said intermediate surface to emit the pumping beam onto a position different from the laser medium; and a main body connected to said intermediate surface and having a disk shape and a plurality of surfaces for confining the pumping beam introduced therein through said intermediate surface, by repeating total internal reflection at said surfaces; wherein said main body distributes the pumping beam confined therein over said laser medium having a contact area where said laser medium is in contact with said surfaces of said main body.

* * * * *